United States Patent
Rivi et al.

[11] Patent Number: 5,766,641
[45] Date of Patent: Jun. 16, 1998

[54] MAGNETIC PLATES FOR ANCHORING MOLDS

[75] Inventors: Giovanni Rivi; Roberta Rivi; Davide Rivi, all of San Valentino Di Castellarano, Italy

[73] Assignee: Rivi Giovanni & C. S.n.c., Sassuolo, Italy

[21] Appl. No.: 887,105

[22] Filed: Jul. 2, 1997

[30] Foreign Application Priority Data

Jul. 4, 1996 [IT] Italy ............... MO960023 U

[51] Int. Cl.$^6$ ............... B29C 33/32
[52] U.S. Cl. ............... 425/3; 100/917; 425/186; 425/192; 425/193; 425/406
[58] Field of Search ............... 425/3, 186, 190, 425/192 R, 193, 406, DIG. 33; 100/917; 248/206.5

[56] References Cited

U.S. PATENT DOCUMENTS

| | | | |
|---|---|---|---|
| 3,353,218 | 11/1967 | Cloud et al. | 425/DIG. 33 |
| 4,115,840 | 9/1978 | Horton | 361/400 |
| 4,460,326 | 7/1984 | Croseck et al. | 425/3 |
| 5,007,814 | 4/1991 | Saunders et al. | 425/3 |
| 5,282,733 | 2/1994 | Noritake et al. | 425/DIG. 33 |
| 5,690,969 | 11/1997 | Fang | 425/DIG. 33 |

*Primary Examiner*—Khanh P. Nguyen
*Attorney, Agent, or Firm*—Fenwick & West LLP

[57] ABSTRACT

The improved upper magnetic plate for anchoring molds, is constituted by a body made of steel with high magnetic permeability in which recessed seats are provided for accommodating coils adapted to generate an attracting magnetic field, the improvement consisting in that the coils are constituted by turns of wire made of a material such as a fluorocarbon resin perfluor alkoxy (PFA) and wrapped by a peripheral containment lapping made of an adhesive tape which has a vitreous base; the coils are arranged in the corresponding recessed seats and are locked therein by a thermosetting silicone containing filling material which is initially inserted in the plastic and malleable state; the seats can be closed in an upward region with plates made of diamagnetic material.

4 Claims, 1 Drawing Sheet

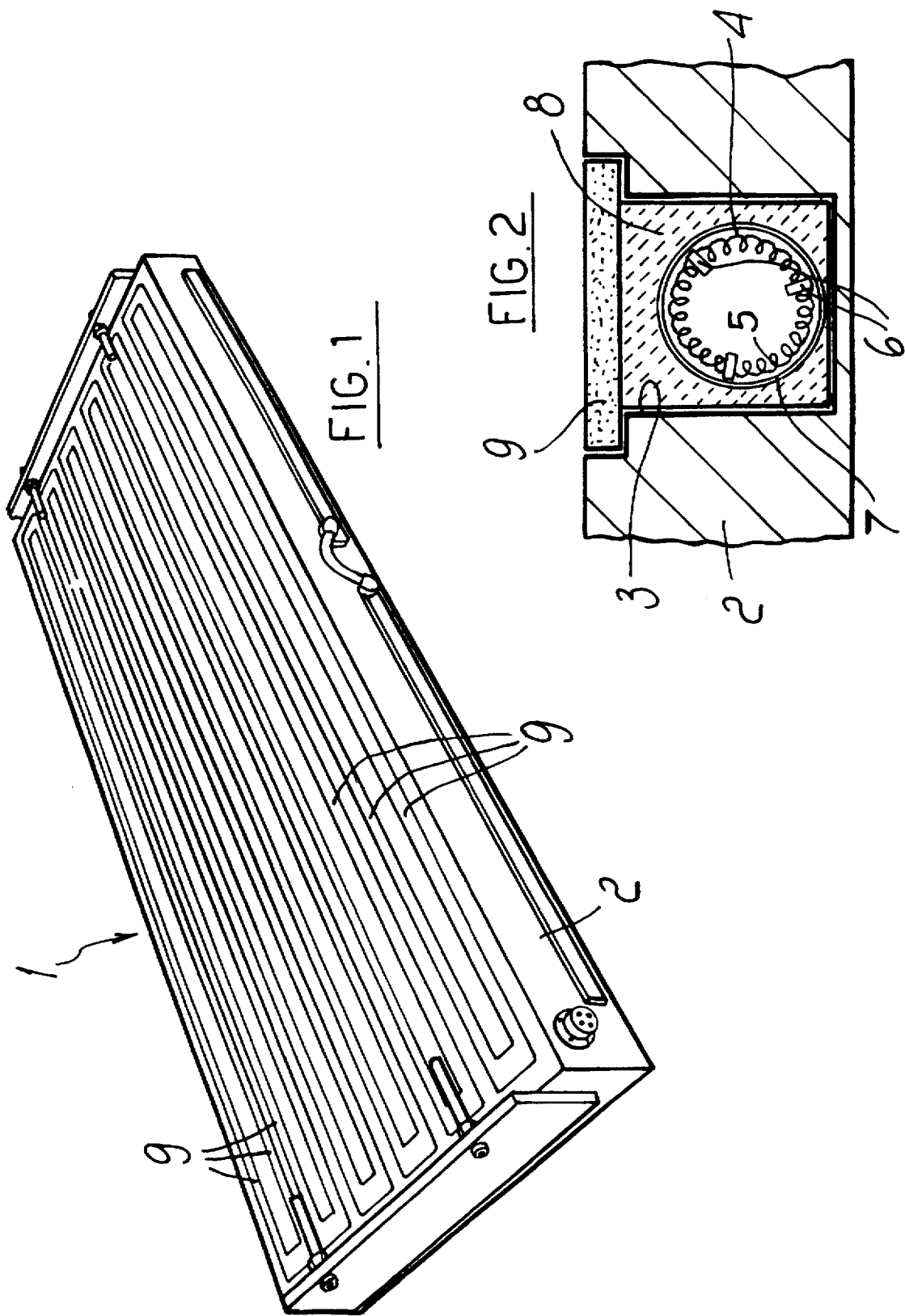

MAGNETIC PLATES FOR ANCHORING MOLDS

BACKGROUND OF THE INVENTION

The present invention relates to an improvement to magnetic plates for anchoring molds.

It is known that hot molding is used in the production of items made of elastomeric materials.

The molds of the presses are supported by means of magnetic anchoring plates, which generate adapted fields of adequate strength for said supporting action.

Said plates essentially consists of a flattened structure, mainly made of steel with high magnetic permeability, in which the surface is affected by a series of slots in which the coils adapted to generate said magnetic fields are accommodated and embedded; said slots are then closed flush to the surface of the plate by means of brass plates.

However, due to the high operating temperatures that must be reached for good operation of the molds, it has been observed that magnetic supporting plates suffer severe damage to said coils, with the consequence that they burn out and become ineffective in use.

Since said plates have significant costs, the resulting financial damage is proportionally high.

Moreover, an accidental separation of the mold from the plate during the operation of the press can severely damage the structure of said press.

In detail, the above drawbacks are caused essentially by the fact that for manufacturing and fixing the coils in said slots materials are used, whose technical specifications have an attainable upper maximum limit, specially in terms of temperature, which is in fact the very temperature to which the molds must usually be brought in order to have a good operation thereof.

Furthermore, owing to the natural tendency of said materials to have a certain heat inertia, in order to reach the operating temperature it becomes necessary to exceed the threshold of said temperature by a given amount in order to then achieve return to said operating value.

These temperature peaks further worsen the problem of the resistance of the materials used.

Finally, the thickness of the magnetic plate also affects the behavior of said materials, since the temperatures are lower in the inner layers close to the surface, whilst inside, where the required magnetic field is produced, the temperatures are significantly higher in terms of absolute value.

In practice, the turns of the coils are currently made of enameled copper wire and are subjected to a containment lapping provided by means of cotton tapes.

The resulting coil is inserted in the slot provided for this purpose in the plate and is fixed in it by pouring epoxy resin; then a brass covering is placed so as to close said slot.

The enamelled copper wire used to produce the coils has a maximum operating temperature which is significantly lower than 200° C. and the epoxy resin has a maximum attainable temperature of less than 100° C.

However, the optimum operating temperature of a mold for elastomeric products is, as mentioned, approximately 200° C., so that said materials being used substantially work at the limit of their performance if not beyond it.

SUMMARY OF THE INVENTION

The principal aim of the present invention is to solve the above problems of the known art by providing an improvement to magnetic plates for anchoring molds which allows to use said plates even with operating temperatures close to 200° C. without causing damage.

This aim and other objects are achieved by an improvement to magnetic plates for anchoring molds, constituted by a body made of steel with high magnetic permeability comprising recessed seats, and accommodated in said seats, coils adapted to generate an attracting magnetic field, the improvement consisting in that said coils are constituted by turns of wire made of an electro-conductive material being insulated with a fluorocarbon resin perfluor alkoxy (PFA), said turns being mutually fastened by a strap which has a vitreous base and being wrapped by a peripheral containment lapping made of an adhesive tape which has a vitreous base, said coils being arranged in the corresponding recessed seats and being fixed therein with thermosetting silicone containing filling material which is insertable in said seats in a plastic and malleable state, said seats being further closeable in an upward region with plates made of diamagnetic material.

BRIEF DESCRIPTION OF THE DRAWINGS

Further characteristics and advantages will become apparent from the description of a preferred embodiment of an improvement to magnetic plates for anchoring molds, illustrated only by way of non-limitative example in the accompanying drawings, wherein:

FIG. 1 is a perspective view of a magnetic plate for anchoring a mold;

FIG. 2 is an enlarged-scale transverse sectional view of a detail of a seat for accommodating a coil.

DESCRIPTION OF THE PREFERRED EMBODIMENT

With particular reference to the above figures, the reference numeral 1 generally designates a magnetic plate for anchoring molds, which is constituted by a body 2 made of steel with high magnetic permeability.

Recessed seats 3 are formed in the body 2 in a longitudinal direction and parallel to each other; the coils 4, adapted to generate an attracting magnetic field, can be accommodated in said seats.

Said coils 4 are constituted by a plurality of turns 5 of wire made of an electro-conductive material insulated with a fluorocarbon resin, commercially available under the trade name TEFLON, PFA, and which are mutually fastened by means of an adhesive strap 6 which has a vitreous base.

Such a combination has surprisingly been found as the most suitable for the purposes of the invention.

The assembly is lapped by a peripheral containment lapping 7 constituted by a tape which also has a vitreous base.

The TEFLON, PFA, material is a fluorocarbon resin having a stable dielectric constant at high temperature, a high thermal resistance and maybe processed by extrusion.

The coils 4 are usually arranged in the corresponding recessed seats 3 in the body 2 and are locked in them by means of a filling 8 made of plastic and malleable material such as silicone rubber, which subsequently sets.

Finally, said seats 3 are closed in an upward region by means of plates 9 made of diamagnetic material, which are placed flush with the contact surface of the plate 1.

The functional use of the plates 1 executed according to the present improvement is identical to that of known plates.

However, the TEFLON, PFA (where PFA is the acronym of Per-Fluoro-Alkoxy) that constitutes the turns of the coils 4 withstands temperatures up to 260° C., and silicone rubber, too, which is in the malleable plastic state, maintains its characteristics unchanged up to a temperature of 230° C.

Substantially, the same temperature resistances are also available in the case of the tape used for the peripheral lapping 7 and in that of the adhesive strap 6, so that at the above mentioned operating temperature of the molds for the production of elastomeric items, around 200° C., the magnetic plate 1 suffers no damage and maintains its operating characteristics unchanged.

It has thus been observed that the described invention achieves the intended aim and objects.

The present invention thus conceived is susceptible of modifications and variations, all of which are within the scope of the inventive concept.

All the details may also be replaced with other technically equivalent elements.

In the practical embodiment of the invention, the materials used, as well as the shapes and the dimensions, may be any according to the requirements without thereby abandoning the scope of the protection of the appended claims.

What is claimed is:

1. An improved upper magnetic plate for anchoring molds comprising:

at least one recessed seat; and coils accommodated in said at least one seat, said coils being adapted to generate an attracting magnetic field, the improvement consisting in that, said coils comprise: turns of wire made of an electro-conductive material; an insulation provided on said wires, said insulation being made of a fluorocarbon resin perfluor alkoxy (PFA); a strap for fastening to each other said turns, said strap having a vitreous base; a peripheral containment lapping made of an adhesive tape and having a vitreous base, said turns being wrapped by said lapping; a thermosetting silicone containing filling material which is insertable in said at least one seat in a plastic and malleable state for enclosing and fixing said coils in said at least one seat, and in that diamagnetic material plates are further provided for closing in an upward region thereof said at least one seat.

2. An improved upper magnetic plate for anchoring molds according to claim 1, wherein said perfluor alkoxy resin is a material having a stable dielectric constant at high temperature, a high thermal resistance, and is processable by extrusion.

3. An improved upper magnetic plate for anchoring molds according to claim 1, wherein said diamagnetic plates are made of brass.

4. An improved upper magnetic plate for anchoring molds according to claim 2, wherein said filling material is a silicone rubber.

* * * * *

UNITED STATES PATENT AND TRADEMARK OFFICE
CERTIFICATE OF CORRECTION

PATENT NO. : 5,766,641
DATED : June 16, 1998
INVENTOR(S) : Rivi et al

Page 1 of 2

It is certified that error appears in the above-identified patent and that said Letters Patent is hereby corrected as shown below:

On the title page: Item [56] insert the following.

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 3 | 0 | 4 | 7 | 3 | 9A | 4/94 | Klug et al | | | |
| | | 3 | 1 | 9 | 5 | 2 | 0 | 7A | 7/65 | Fougea | | | |

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|---|
| | | | | | | | | | | | | | YES | NO |
| | | 6 | 5 | 0 | 6 | 5 | 4 | A | 2/51 | United Kingdom | | | | |
| | | 4 | 9 | 5 | 0 | 3 | 8 | A | 8/50 | Belgium | | | | |
| | | 2 | 4 | 4 | 1 | 4 | 59 | A | 6/80 | France | | | | |

UNITED STATES PATENT AND TRADEMARK OFFICE
CERTIFICATE OF CORRECTION

PATENT NO. : 5,766,641
DATED : June 16, 1998
INVENTOR(S) : Rivi et al

It is certified that error appears in the above-identified patent and that said Letters Patent is hereby corrected as shown below:

OTHER DOCUMENTS

|   |   |
|---|---|
|   | PATENT ABSTRACTS OF JAPAN vol. 013, no. 485 (M-887), 6 November 1989 |
|   | & JP 01 192517A (NISSAN MOTOR CO LTD), 2 August 1989. |
|   | PATENT ABSTRACTS OF JAPAN vol. 006, no. 042 (E-098), 16 March 1982 & JP 56 160012 A |
|   | (TOSHIBA CORP), 9 December 1981. |

Signed and Sealed this

Fourth Day of May, 1999

Attest:

Attesting Officer

Q. TODD DICKINSON

Acting Commissioner of Patents and Trademarks